(12) United States Patent
Frazier

(10) Patent No.: US 7,982,653 B1
(45) Date of Patent: Jul. 19, 2011

(54) RADAR DISRUPTION DEVICE

(75) Inventor: Gary A. Frazier, Garland, TX (US)

(73) Assignee: Raytheon Company, Waltham, MA (US)

( * ) Notice: Subject to any disclaimer, the term of this patent is extended or adjusted under 35 U.S.C. 154(b) by 402 days.

(21) Appl. No.: 12/340,160

(22) Filed: Dec. 19, 2008

Related U.S. Application Data

(60) Provisional application No. 61/015,600, filed on Dec. 20, 2007.

(51) Int. Cl.
*G01S 7/38* (2006.01)

(52) U.S. Cl. .............................. 342/13; 342/14; 102/501

(58) Field of Classification Search .............. 342/13–15; 102/505, 489, 334, 357, 370, 393, 501; 89/1.816, 89/1.819, 6.5
See application file for complete search history.

(56) References Cited

U.S. PATENT DOCUMENTS

| | | | |
|---|---|---|---|
| 3,221,875 A | 12/1965 | Paquette | |
| 3,301,721 A * | 1/1967 | McCoy et al. | ..................... 149/2 |
| 4,130,059 A | 12/1978 | Block et al. | |
| 4,307,665 A * | 12/1981 | Block et al. | ................... 102/505 |
| 4,406,227 A | 9/1983 | Beeker et al. | |
| 4,471,358 A * | 9/1984 | Glasser | ............................. 342/12 |
| 4,704,966 A | 11/1987 | Sellman et al. | |
| 5,076,171 A * | 12/1991 | Altenau et al. | ................ 102/489 |
| 5,083,128 A * | 1/1992 | Tsuji | ................................. 342/2 |
| 5,369,408 A | 11/1994 | Tsui et al. | |
| 6,012,375 A * | 1/2000 | Eckstein | ...................... 89/1.816 |
| 6,279,482 B1 | 8/2001 | Smith et al. | |
| 6,513,438 B1 | 2/2003 | Fegg et al. | |
| 6,655,292 B1 * | 12/2003 | Salzeder | ....................... 102/334 |
| 7,369,081 B1 | 5/2008 | Ganz et al. | |
| 7,735,945 B1 * | 6/2010 | Sliwa et al. | ....................... 347/6 |
| 7,815,820 B2 * | 10/2010 | Tan et al. | ................... 252/518.1 |
| 2005/0139363 A1 * | 6/2005 | Thomas | ......................... 169/30 |

FOREIGN PATENT DOCUMENTS

WO    WO 2010123597 A1 *    10/2010

\* cited by examiner

*Primary Examiner* — John B Sotomayor
(74) *Attorney, Agent, or Firm* — Baker Botts L.L.P.

(57) ABSTRACT

According to one embodiment, a radar disruption device includes an electro-magnetic sensitive fluid encased in a shell. The electro-magnetic sensitive fluid is operable to modify the phase or amplitude of electro-magnetic signals. The shell is operable to rupture upon impact with a radar and spread the electro-magnetic sensitive fluid over a portion of the radar.

21 Claims, 3 Drawing Sheets

RADAR DISRUPTION DEVICE

RELATED APPLICATIONS

This application claims priority to U.S. Provisional Patent Application Ser. No. 61/015,600, entitled "RADAR DISRUPTION DEVICE," which was filed on Dec. 20, 2007.

TECHNICAL FIELD OF THE DISCLOSURE

This disclosure generally relates to radars, and more particularly to a radar disrupting device operable to disrupt electro-magnetic signals transmitted or received from a radar.

BACKGROUND OF THE DISCLOSURE

Military combat devices may include radars that use electro-magnetic signals. In some cases, it may be useful to disrupt an enemy's radar. Devices that disrupt radars are commonly referred to as radar countermeasures. One example of a radar countermeasure is an anti-radiation missile (ARM) that destroys enemy radars using kinetic or chemical energy.

SUMMARY OF THE DISCLOSURE

According to one embodiment, a radar disruption device includes an electro-magnetic sensitive fluid encased in a shell. The electro-magnetic sensitive fluid is operable to modify the phase or amplitude of electro-magnetic signals. The shell is operable to rupture upon impact with a radar and spread the electro-magnetic sensitive fluid over a portion of the radar.

Some embodiments of the disclosure provide technical advantages. For example, according to one embodiment, a radar disruption device may hamper operation of a radar. The device may be shot towards a radar. Upon impact, the device releases an electro-magnetic sensitive fluid from its shell in a manner that modifies the phase or amplitude of signals of the radar. In some cases, the device does not cause significant damage to the radar. Thus, embodiments of the radar disruption device may be used to temporarily hamper operation of radars without permanently damaging the radars.

Some embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

Figure 1:
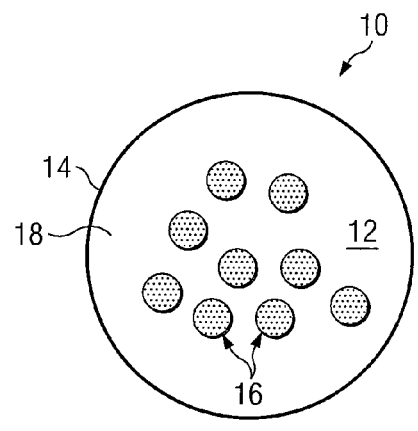
FIG. 1 is a cross-sectional view of one embodiment of a radar disrupting device according to the teachings of the present disclosure.

FIG. 1 shows one embodiment of a radar disruption device 10 that may be used to hamper operation of a radar. Radar disrupting device 10 includes an electro-magnetic sensitive fluid 12 encapsulated by a shell 14. In the illustrated embodiment, electro-magnetic sensitive fluid 12 comprises an electro-magnetic sensitive material 16 suspended in carrier agent 18. In other embodiments, electro-magnetic sensitive material 16 may be dissolved in carrier agent 18 to form a generally homogeneous solution.

Shell 14 may have any suitable shape to enclose fluid 12, such as a shape that is topologically homeomorphic to a substantially hollow sphere. In one embodiment, shell 14 may be generally spherical to facilitate movement through the atmosphere. Shell 14 may have any suitable size. In one embodiment, shell 14 may have a diameter in the range of approximately less than 1, 1 to 3, 3 to 5, or greater than 5 centimeters. Shell 14 may comprise any suitable material of any suitable thickness. The material and thickness may be selected such that shell 14 ruptures upon impact with the radar. For example, shell 14 may comprise polyethylene, polyurethane, thin metal, glass, or gelatin of a thickness in the range of approximately less than 1, 1 to 5, or greater than 5 millimeters. In one embodiment, the surface of shell 14 may have a textured surface with structural characteristics, such as dimples, to facilitate movement through the atmosphere.

Electro-magnetic sensitive material 16 may comprise any material that can modify the amplitude and/or phase of electro-magnetic signals. For example, electro-magnetic sensitive material may have a high optical index of refraction, a high optical absorption coefficient, and/or a high magnetic permeability at the frequency of the electro-magnetic signals. In one embodiment, electro-magnetic sensitive material 16 includes glycerol oil or furfural oil that has dielectric constants in the range of approximately 40 to 70.

In another embodiment, electro-magnetic sensitive material 16 includes doped garnet, ferrites, or ferro-ceramic particles that are formulated to have relatively high dielectric constants and/or relatively high magnetic permeabilities at radar frequencies. In another embodiment, electro-magnetic sensitive material may include $CaCu_3Ti_4O_{12}$ that has a dielectric constant of approximately 10,000 at frequencies below 1 Mega-Hertz (MHz). In another embodiment, electro-magnetic sensitive material 16 includes titanium-dioxide, which is commonly referred to as rutile.

In another embodiment, electro-magnetic sensitive material 16 includes particles with a geometric shape that resonates at the operating frequency of the radar. For example, electro-magnetic sensitive material 16 may include wires, rods, or plates made of carbon nanotubes, aluminum, gold, nickel, silver plated rods or sheets, plastic, glass, or other conductors with dimensions that cause resonance at the operating frequency of the radar. For example, electrically conducting particles may have a length that is an integer multiple of the operating frequency of the radar. When dispersed over the radar's surface, the electrically conducting particles may scatter radiation from the radar across a relatively broad range of angles with respect to the radar's surface.

In some cases, directing a portion of the scattered electro-magnetic energy away from the main radar beam may make the radar more susceptible to attack. Radio receivers operating at the radar's transmit frequency may detect and use the portion of the scattered electro-magnetic energy to attack the radar. For example, an anti-radiation missile may use this electro-magnetic energy to attack the radar.

Carrier agent 18 suspends electro-magnetic sensitive material 16 through electro-magnetic sensitive fluid 12 in a uniform or non-uniform manner. In some embodiments, carrier agent 18 may modify the amplitude and/or phase of electro-magnetic signals. Carrier agent 18 may impart various characteristics to the electro-magnetic sensitive fluid 12, such as viscosity, color, and/or visual opacity. The viscosity of electro-magnetic sensitive fluid 12 may affect the adhesion of the electro-magnetic sensitive fluid 12 to a radar surface, and the thickness of electro-magnetic sensitive fluid 12 as it spreads over the surface. Carrier agents 18 may also include coloring pigments. Coloring pigments may approximately match the color of the radar surface or may be generally transparent to conceal the electro-magnetic sensitive fluid 12 from detection, such as by visual inspection.

Electro-magnetic sensitive fluid 12 may be deposited over the radar surface by kinetic impact of shell 14 with the radar. The viscosity of the electro-magnetic sensitive fluid 12 may affect the dynamic flow of electro-magnetic sensitive fluid 12 over the radar surface. The speed of the radar disrupting device 10 when it hits the radar surface may also affect the thickness of the dispersed electro-magnetic sensitive fluid 12. For example, a relatively low viscosity electro-magnetic sensitive fluid 12 that collides at high speed may tend to spread over a larger area than a relatively high viscosity electro-magnetic sensitive fluid 12 colliding at a lower speed.

The viscosity of electro-magnetic sensitive fluid 12 may be chosen in accordance with the desired effect upon the radar and the properties of the radar. For example, a high frequency dish-type radar, such as one operating at approximately 100 Giga-Hertz (GHz), may have a characteristic wavelength of approximately 3 millimeters. A 0.1 millimeter layer of electro-magnetic sensitive fluid 12 comprising silicon having a dielectric constant of 13.6. may induce a composite 90 degrees phase shift to signals reflected from the radar surface. A lower frequency radar, such as one operating at approximately 10 Giga-Hertz (GHz), may have a proportionately longer characteristic wavelength, and may require a proportionately thicker layer of electro-magnetic sensitive fluid 12 to provide the same phase shift effect. For example, the layer may be 10 times thicker. The viscosity of the carrier fluid may be tailored to yield a dispersed thickness as determined by the operating properties of the radar. In other cases, electro-magnetic sensitive fluid 12 with a proportionately higher dielectric constant or magnetic permeability may be used to provide a similar effect.

Table 1 shows the viscosities of several materials at 20 degrees Celsius. In one embodiment, carrier agent 18 may include none, some, or all of the materials shown. In other embodiments, carrier agent 18 may include silicon oil, mineral oil, or any suitable solvent, such as ethanol or alcohol.

TABLE 1

| Material (20° C.) | Viscosity (milliPascal-seconds) |
| --- | --- |
| Acetone | 0.4 |
| Water | 0.9 |
| Ethylene Glycol | 16.1 |
| Olive Oil | 81.0 |
| Glycerol | 930.0 |

Figure 2:
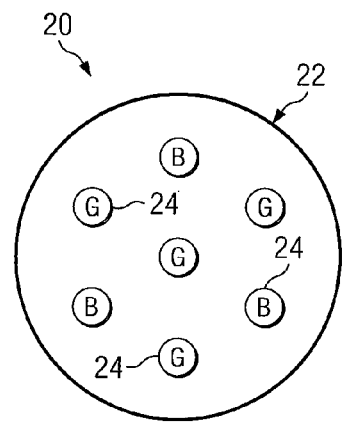
FIG. 2 is a cross-sectional view of another embodiment of a radar disrupting device according to the teachings of the present disclosure.

FIG. 2 shows another embodiment of radar disrupting device 20. Radar disrupting device 20 comprises a shell 22 encasing a number of smaller capsules 24. Each of the capsules 24 encases an electro-magnetic sensitive fluid 12 as described above. Electro-magnetic sensitive fluid 12 in capsules 24 may have various coloring pigments, such as green G or brown B. Upon impact with the radar, shell 22 and capsules 24 may rupture and dispense electro-magnetic sensitive fluid 12 over the radar. The various coloring pigments may form a camouflage pattern that may be relatively similar to the color pattern of the radar's surface. The various coloring pigments may conceal the presence of the electro-magnetic sensitive fluid 12.

Figure 3:
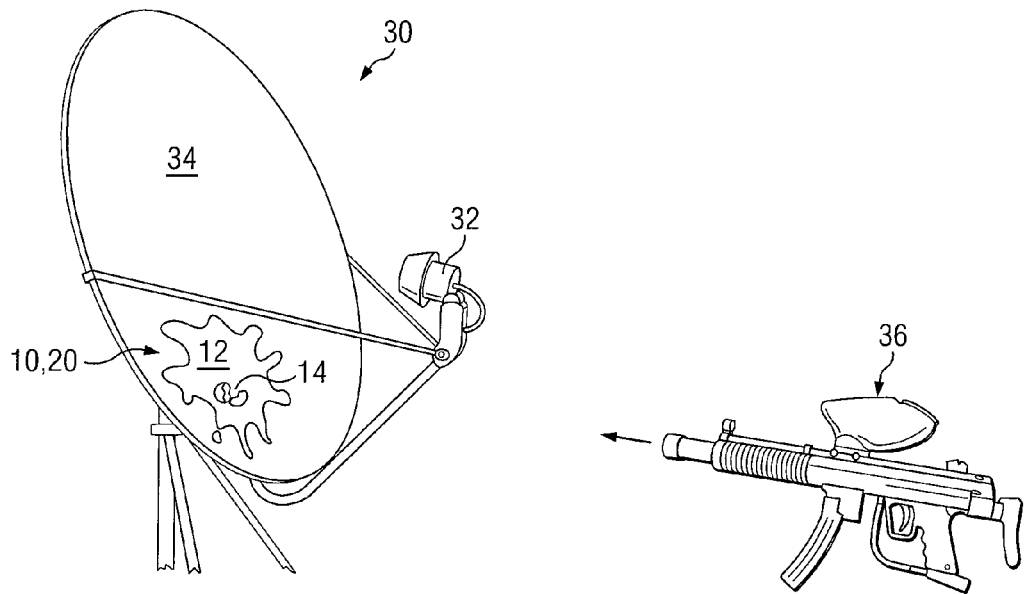
FIG. 3 is an example of a radar that has been disrupted by a radar disrupting device shot by a gun.

FIG. 3 shows an example radar 30 having a layer of electro-magnetic sensitive fluid 12 dispersed over a portion of its surface by a radar disrupting device 10 fired from a gun 36. Radar 30 communicates, for example, transmits and/or receives signals. In the illustrated example, radar 30 is a reflective or dish radar. Radar 30 has a radar feed 32 configured at the focal point of a parabolic dish 34. The transmit signal is transmitted from radar feed 32. The parabolic dish 34 may be mechanically scanned in azimuth and elevation to sweep narrowly focused radio frequency energy across the sky.

The radar's radiation pattern has a mainlobe and multiple sidelobes. The width in angle of the mainlobe is determined primarily by the area or aperture of the parabolic dish 34. A larger aperture generally results in a narrower or tighter mainlobe. The sidelobes are produced by electro-magnetic signals that reflect off of the aperture near its edges. The mainlobe intensity may be greater than the intensity of the sidelobes. That is, the mainlobe-to-sidelobe intensity ratio may be greater than one.

In certain embodiments, electro-magnetic sensitive fluid 12 may be placed near the edges of parabolic dish 34 to absorb radio frequency energy and change the phase of electro-magnetic signals. The change in phase may change the radiation pattern, such as affect the mainlobe-to-sidelobe intensity ratio and/or broaden the angle width of the main beam.

In certain embodiments, radar 30 may have an active electronically scanned array (AESA). The relative amplitude and phase of the elements of an active electronically scanned array are controlled to yield a radiation pattern similar to a parabolic dish radar. Changing the relative amplitude and/or phase of an element may change the radiation pattern. Electro-magnetic sensitive fluid 12 placed on the surface of the active electronically scanned array may absorb radiation or shift the phase, which may change the radiation pattern.

In certain embodiments, radar 30 may have a split array that uses phase-comparison monopulse techniques. The split array has two halves that generate similar radiation patterns with mainlobes pointed at similar azimuth and elevation angles. The amplitude of an echo signal received by the two halves is the same regardless of the direction of maximum radiated intensity. If an angle error exists between the direction of the main beam and the target, there is a corresponding phase shift in the signal returned to the radar. The resulting phase difference is used to reposition the main two beams towards the target. Electro-magnetic sensitive fluid 12 placed on one half of the split array may cause phase shifts that disrupt this process.

Any suitable delivery system may be used to deliver radar disrupting device 10 to radar 30. In the particular embodiment shown, a gun 36, such as a paintball gun, delivers radar disrupting device 10 to radar 30. Gun 36 may project radar disrupting device 10 toward radar 30 using a blast of air or other suitable form of propulsion at a distance of approximately 50 to 100 meters from radar 30.

In other embodiments, the delivery system may comprise a micro unmanned aerial vehicle that drops radar disrupting device 10 from a payload door of the micro unmanned aerial vehicle. In another embodiment, the delivery system may be a global positioning system (GPS) guided munition carrying radar disrupting device 10 as a payload.

Figure 4:
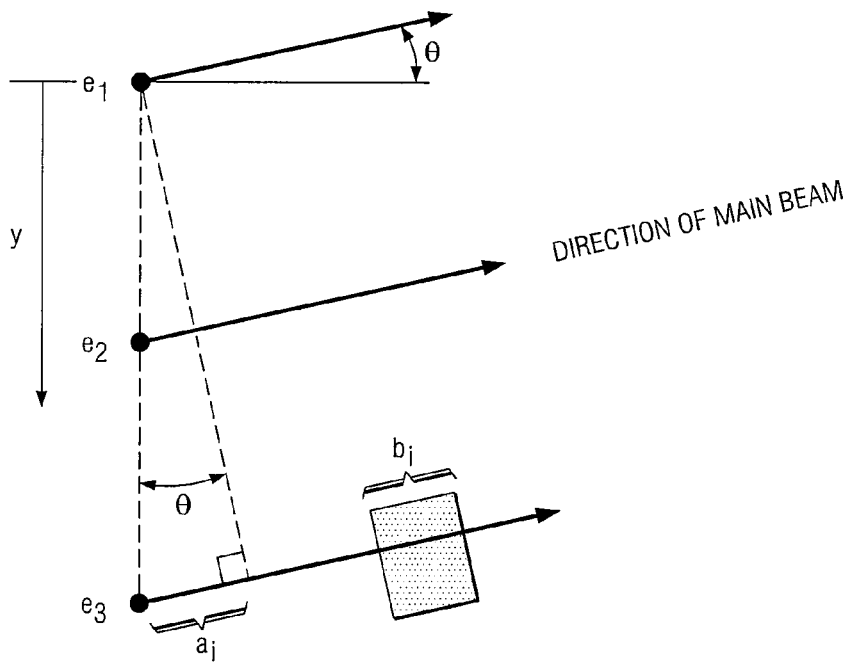
FIG. 4 is a diagram showing electro-magnetic signals emitted from the surface of an example active electronically scanned array radar.

FIG. 4 is a diagram showing electro-magnetic signals emitted from the surface of an active electronically scanned array. Elements $e_1$, $e_2$, and $e_3$ may each have an independent amplitude and phase. If the target is at sufficient range, the waves emitted from each element may be assumed to have the same relative angle with respect to the normal to the plane of the array. Electro-magnetic sensitive fluid 12 may be placed in the path of $e_3$ such that electro-magnetic signal passes through the material.

The total electric field emitted from the array in a particular direction is found by adding the electric field strength of each element in that direction. For this example, the total electric field at a distant point at a given time t is given approximately as:

$$E_{TOTAL} = e^{i\omega t} \sum_{i=1}^{N} A_i e^{i\phi_i} e^{-i\frac{a_i}{c}\sin\theta} e^{-i\frac{(n-1)b_i}{c}} e^{-\beta b_i}$$

where $\Theta$ is the angle of the measurement (target) point in space relative to the array; $\omega$ is the angular frequency of elements $e_1$, $e_2$, and $e_3$; $A_i$ is the amplitude of element i; $a_i$ is the additional path that the radiation from each element i must traverse in the direction of $\Theta$; $b_i$ is the path length taken by the radiation through the dielectric slab; and $\beta$ is the absorption coefficient per unit length of the slab material at the frequency $\omega$. The parameter $\phi_i$ is the relative phase of the waves emitted by each of the i elements. The parameter n is the optical index of refraction of the material used in the slab. Typically, n can vary from 1.02 for foams to 4 or greater for semiconductors and ferromagnetic materials, depending upon the magnetic and electric permittivities of the material. The sinusoidal time response of the radiation ($e^{i\omega t}$) is common to all elements.

According to the equation, changing the amplitude and/or phase of the radiating elements changes the net electric field of the element array. The amplitude and/or phase may be changed by altering the intrinsic amplitude and phase parameters ($A_i$, $\phi_i$) of an element or by altering the extrinsic amplitude or phase parameters ($n, b_i, \phi_i$) of the materials inserted into the path of radiation.

The equation may be applied to radar 30 shown in FIG. 3 to determine characteristics of electro-magnetic sensitive fluid 12. In the example, the area of parabolic dish 34 is 8100 cm$^2$, and the radar feed 32 operates at 100 gigahertz (GHz). In certain embodiments, the thickness and dielectric properties of electro-magnetic sensitive fluid 12 may be selected to yield a particular phase shift PS of transmitted or received signals relative to signals from an uncoated dish surface. Electro-magnetic signals pass through the electro-magnetic sensitive fluid 12 when they are transmitted and when they are received, so the one-way phase shift $PS_{one-way}$ may be PS/2 degrees. For example, a 180 degree two-way phase shift PS corresponds to a 90 degree one-way phase shift $PS_{one-way}$.

A particular one-way optical path length OPL yields a particular one-way phase shift $PS_{one-way}$, and may be used to determine the thickness and optical refractive index of fluid 12 that yields the particular one-way phase shift $PS_{one-way}$. For example, if the radar feed 32 operates at 100 GHz, a one-way optical path length OPL=0.75 millimeters yields a 90 degree one-way phase shift $PS_{one-way}$. The optical path length OPL is equal to the geometrical thickness GT of the coating multiplied by the optical refractive index n of the material, so the geometrical thickness GT may be OPL/n millimeters. For example, fluid 12 may comprise elemental silicon, which has a refractive index n=3.7 at microwave frequencies. Accordingly, the geometric thickness GT is approximately 0.2 millimeters. The viscosity of fluid 12 and/or speed and/or acceleration of device 10 towards the radar may be selected to yield the desired geometric thickness GT.

The geometric thickness GT and the volume VOL of fluid 12 may be used to calculate the coverage of fluid 12 on dish 34. The area AR that fluid 12 can cover can be calculated from VOL/GT. For example, if the volume VOL is 2 cubic inches and the geometric thickness GT is 0.2 millimeters, then the coverage area AR is 1620 cm$^2$. The coverage area AR may be compared with the area of area of parabolic dish 34. In this example, the coverage area AR is 20 percent of parabolic dish 34 area.

Figure 5:
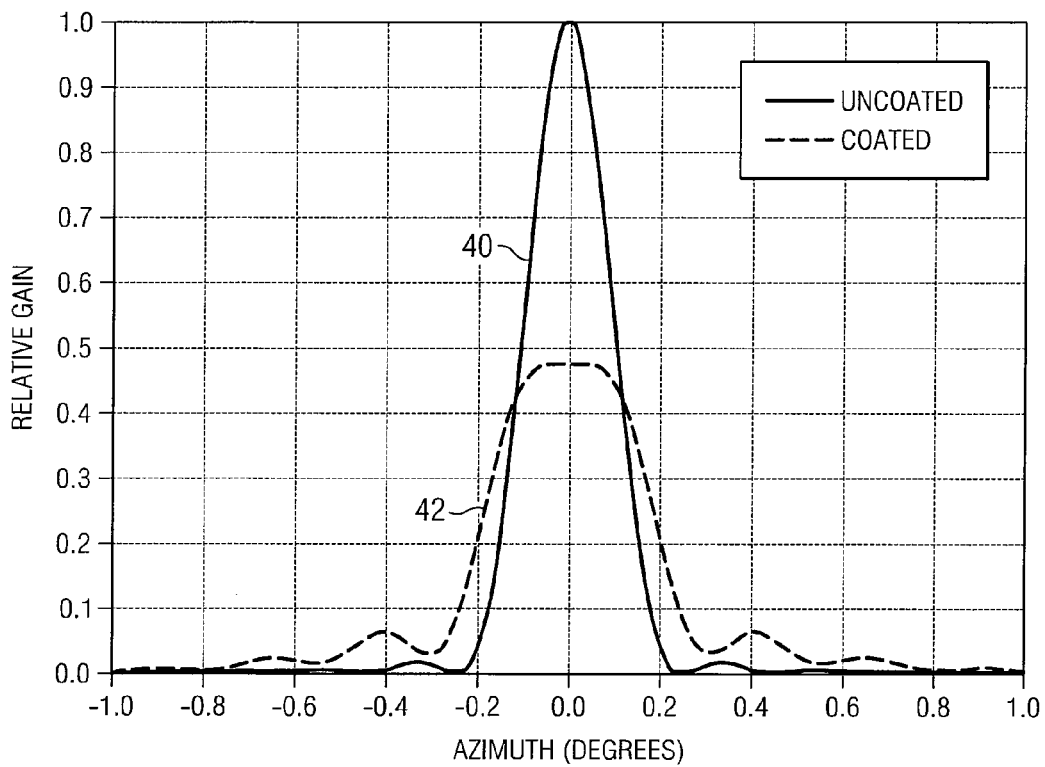
FIG. 5 is a graph showing normalized gain plots of electro-magnetic signals to and from the radar of FIG. 3.

FIG. 5 is a graph showing normalized gain of electro-magnetic signals to and from radar 30. Plot 40 shows the normalized gain of an electro-magnetic signal that does not pass through electro-magnetic sensitive fluid 12, and plot 42 shows the normalized gain of another electro-magnetic signal that passes through electro-magnetic sensitive fluid 12. As shown, electro-magnetic sensitive fluid 12 widens the beam width of the mainlobe and lowers the peak gain by more than a factor of 2. The reduction in gain of radar 30 generally reduces the effective detection range. If other parameters are equal, the range of radar 30 may be proportional to the square root of the antenna gain. In this example, the range of radar 30 may be degraded to about 68 percent of its initial value.

Figure 6:
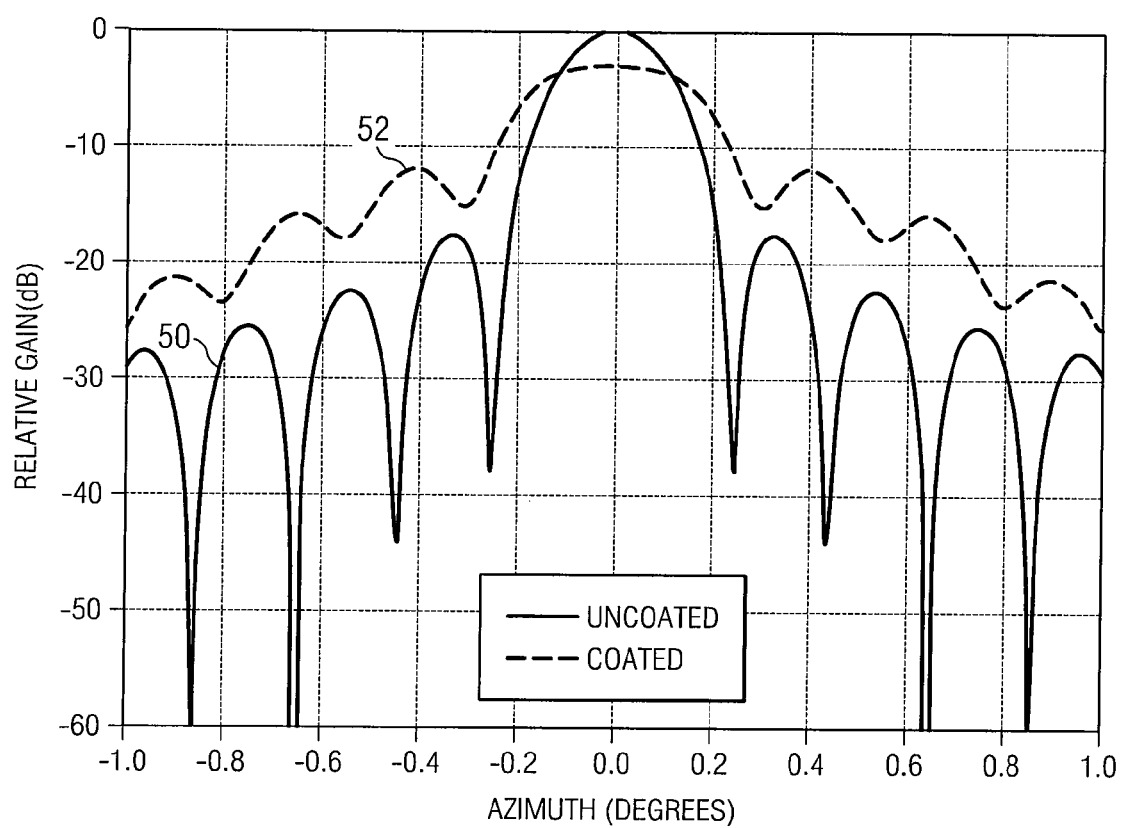
FIG. 6 is a graph showing the focusing properties of the coated and uncoated portions of the radar of FIG. 3.

FIG. 6 is a graph showing the focusing properties of the coated and uncoated portions of the parabolic dish 34. Plot 50 shows a normalized gain of the uncoated portion of parabolic dish 34, and plot 52 shows a normalized gain of a coated portion of the parabolic dish 34 over a range of angles. As shown, the gain of radar 30 is degraded by the addition of electro-magnetic sensitive fluid 12. Additionally, the sidelobes are significantly raised in amplitude relative to sidelobes yielded by the uncoated portion of radar 30. This effect may have adverse consequences for radar 30.

Jamming is a mode of electronic warfare where high power electro-magnetic signals are directed to a radar to mask the echo signal returned from the radar's targets. Normally, a jammer aircraft is not in the line of sight of the radar's targets, and the jammer signal is received by the radar in one of its sidelobes. The sidelobe amplitude may be minimized to reduce the jammed energy. A layer of electro-magnetic sensitive fluid 12 may raise the sidelobe gain of the radar, which may increase the effectiveness of the jammer in some embodiments.

Referring again to FIG. 5, the phase shifting properties of electro-magnetic sensitive fluid 12 increases the sidelobe gain by 14 decibel units (a factor of 25×) at −0.65 degrees. A jammer signal −0.65 degrees off of the mainlobe is 25 times more effective.

Active electronically scanned array radars can electronically adjust the amplitude and phase of their elements to place a null, or minimum gain state, at the location of a sidelobe jammer. Electro-magnetic sensitive fluid 12, however, can distort phase, which reduces or eliminates deep nulls. Accordingly, electro-magnetic sensitive fluid 12 reduces the ability of the array to protect against jamming.

Modifications, additions, or omissions may be made to radar disrupting device 10 or radar disrupting device 20 without departing from the scope of the disclosure. The components of radar disrupting device 10 or radar disrupting device 20 may be integrated or separated. For example, carrier agent 18 may not be needed if electro-magnetic sensitive material 16 has the desired viscous, color, and/or other qualities. Moreover, the operations of radar disrupting device 10 or radar disrupting device 20 may be performed by more, fewer, or other components. For example, other materials may be added to adjust other characteristics of the electro-magnetic sensitive fluid 12. As used in this document, "each" refers to each member of a set or each member of a subset of a set.

Although the present disclosure has been described with several embodiments, a myriad of changes, variations, alterations, transformations, and modifications may be suggested to one skilled in the art, and it is intended that the present disclosure encompass such changes, variations, alterations, transformation, and modifications as they fall within the scope of the appended claims.

What is claimed is:

1. A radar disruption device comprising:
an electro-magnetic sensitive fluid operable to modify a phase or an amplitude of a plurality of electro-magnetic signals according to a dielectric constant or a magnetic permeability of the electro-magnetic sensitive fluid; and
a shell having a spherical shape and a diameter in the range of 1 centimeter to 3 centimeters, the shell configured to:
encapsulate the electro-magnetic sensitive fluid; and
rupture upon impact with a radar to spread the electro-magnetic sensitive fluid over at least a portion of the radar, the radar communicating the electro-magnetic signals.

2. A radar disruption device comprising:
an electro-magnetic sensitive fluid that is operable to modify a phase or an amplitude of a plurality of electro-magnetic signals; and
a shell configured to:
encapsulate the electro-magnetic sensitive fluid; and
rupture upon impact with a radar to spread the electro-magnetic sensitive fluid over at least a portion of the radar, the radar communicating the electro-magnetic signals.

3. The radar disruption device of claim 2, the electro-magnetic sensitive fluid comprising a dielectric material or a magnetic material selected from the group consisting of glycerol oil, furfural oil, doped garnet, ferro-ceramic particles, $CaCu_3Ti_4O_{12}$, silicon, and titanium-dioxide.

4. The radar disruption device of claim 2, the electro-magnetic sensitive fluid comprising a carrier agent selected from the group consisting of acetone, water, ethylene glycol, olive oil, glycerol, silicon oil, mineral oil, ethanol, and alcohol.

5. The radar disruption device of claim 2, the electro-magnetic sensitive fluid comprising a plurality of particles configured to resonate at the operating frequency of the radar.

6. The radar disruption device of claim 2, further comprising a plurality of capsules disposed within the shell, each capsule comprising a pigment configured to color at least a part of the portion of the radar.

7. The radar disruption device of claim 2, the shell having a textured surface.

8. The radar disruption device of claim 2, the shell having a spherical shape and a diameter in the range of 1 centimeter to 3 centimeters.

9. The radar disruption device of claim 2, the electro-magnetic sensitive fluid having a dielectric constant that is selected according to an operating frequency of the radar.

10. The radar disruption device of claim 2, the electro-magnetic sensitive fluid having a refractive index that is selected according to a desired phase shift.

11. The radar disruption device of claim 2, the shell configured to be directed toward the radar by a gun.

12. A radar disruption method comprising:
directing a shell towards a radar communicating a plurality of electro-magnetic signals, the shell encapsulating an electro-magnetic sensitive fluid;
rupturing the shell on the radar to spread the electro-magnetic sensitive fluid over at least a portion of the radar; and
modifying, using the electro-magnetic sensitive fluid, a phase or an amplitude of electro-magnetic signals.

13. The radar disruption method of claim 12, the electro-magnetic sensitive fluid comprising a dielectric material or a magnetic material selected from the group consisting of glycerol oil, furfural oil, doped garnet, ferro-ceramic particles, $CaCu_3Ti_4O_{12}$, silicon, and titanium-dioxide.

14. The radar disruption method of claim 12, the electro-magnetic sensitive fluid comprising a carrier agent selected from the group consisting of acetone, water, ethylene glycol, olive oil, glycerol, silicon oil, mineral oil, ethanol, and alcohol.

15. The radar disruption method of claim 12, the modifying, using the electro-magnetic sensitive fluid, the phase or the amplitude of electro-magnetic signals further comprising:
modifying the phase or the amplitude using a plurality of particles of the electro-magnetic sensitive fluid, the particles configured to resonate at the operating frequency of the radar.

16. The radar disruption method of claim 12, further comprising:
coloring at least a part of the portion of the radar using a plurality of capsules disposed within the shell, each capsule comprising a pigment.

17. The radar disruption method of claim 12, the shell having a textured surface.

18. The radar disruption method of claim 12, the shell having a spherical shape and a diameter in the range of 1 centimeter to 3 centimeters.

19. The radar disruption method of claim 12, the electro-magnetic sensitive fluid having a dielectric constant that is selected according to an operating frequency of the radar.

20. The radar disruption method of claim 12, the electro-magnetic sensitive fluid having a refractive index that is selected according to a desired phase shift.

21. The radar disruption method of claim 12, the directing the shell towards the radar further comprising:
directing the shell towards the radar using a gun.

* * * * *